United States Patent

Hill

[15] 3,638,228

[45] Jan. 25, 1972

[54] AIRCRAFT RANGE PLOTTING MEANS

[72] Inventor: Everett B. Hill, China Lake, Calif.

[73] Assignee: The United States of America as represented by the Secretary of the Navy

[22] Filed: Dec. 4, 1969

[21] Appl. No.: 882,074

[52] U.S. Cl. .................................. 346/8, 35/12 B, 346/29
[51] Int. Cl. ........................................... G01c 21/22
[58] Field of Search .............. 346/8, 29, 38, 2; 35/25, 10.4, 35/10.2, 12 A, 12 B, 12 N, 12 W; 33/67

[56] References Cited

UNITED STATES PATENTS 2,332,523  10/1943  Norden et al. ........................... 35/10.2

Primary Examiner—Joseph W. Hartary
Attorney—R. S. Sciascia, Roy Miller and Gerald F. Baker

[57] ABSTRACT

This invention involves the instrumentation necessary for training aircraft pilots in bombing techniques. The essential elements of the system are a flight-profile plotter, an optical tracker, three impact-spotting quadrants, an impact-spotting board, and a timing console. When the training includes dive bombing and conventional-weapons delivery, optical acquisition and radar acquisition systems are added. This equipment measures the aircraft's speed and flight path while it performs weapons delivery maneuvers.

4 Claims, 8 Drawing Figures

AIRCRAFT RANGE PLOTTING MEANS

GOVERNMENT INTEREST

The invention described herein may be manufactured and used by or for the Government of the United States of America for governmental purposes without the payment of any royalties thereon or therefor.

BACKGROUND OF THE INVENTION

Use of manned aircraft to deliver high potency weapons necessitates techniques to safeguard the pilot as well as the aircraft. In the Navy, the task of developing the necessary techniques for loft bombing, etc., is assigned to Air Development Squadrons of the Operation Test and Evaluation Force. Ideas for improving the instrumentation facilities have been evolved and the following developed at the Naval Weapons Center: (1) the telescope sky screen system to measure airspeed during the run to target and to transmit it to the pilot before his next run; (2) an auxiliary tracker speed switch system to provide a check on the sky screen system and for use when adverse weather conditions render the sky screen system ineffectual; and (3) a mechanical profile tracker-plotter to obtain the contour of the aircraft's flight path in the vertical plane over the flight line during run-in, pullup, and escape—a very necessary prerequisite for correction of errors.

Since the ranges and facilities at the Naval Weapons Center exist primarily to support the Center's research and development activities, it was advocated that naval squadron training ranges be equipped with the improved instrumentation. Ranges are located, for example, at Fallon, Nev.; El Centro, Calif.; Pinecastle, Fla.; Kauna Point, Hawaii; Guantanomo Bay, Cuba; Yuma, Ariz.; Cherry Point, N.C., for the Navy, and at Nellis Air Force Base, Nev., for the Air Force.

As evaluated on the basis of NWC experience with the training ranges now in existence, an optimum training system should consist of the following: (1) a range having a well defined flight line with target and target banners; (2) facilities consisting of a control building, three spotting towers, and a generator building if commercial power is not available; and (3) instrumentation including a telescope sky screen system, an auxiliary speed switch system, two profile tracker-plotters, and standard aerological and communication equipment.

DETAILED DESCRIPTION OF THE INVENTION

Figure 1:
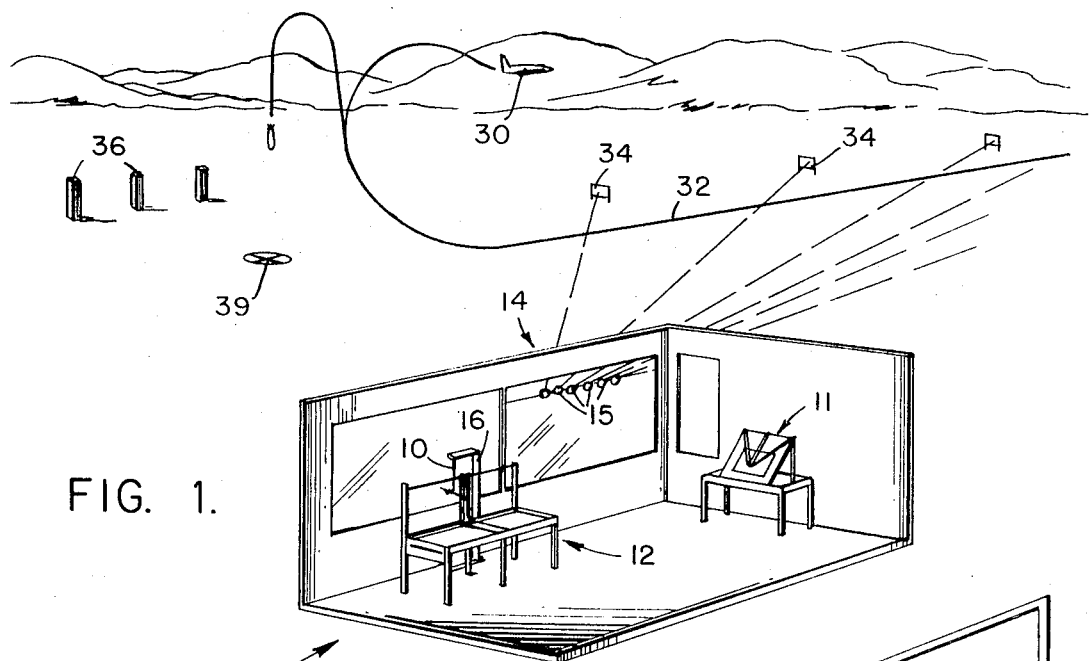
FIG. 1 is a perspective view of an aircraft target range equipped according to the invention.

The tracker 10 is shown in FIG. 1 positioned in front of plotting table 12 in building 18 which also houses the spotting table 11 and a sky screen 14 consisting of a plurality of telescopes 15. Each of telescopes 15 is focused on a respective one of markers 34 accurately positioned along flight line 32. Depicted in this view is a plane 30 lofting a bomb to hit target 39. Each of three spotting towers 36 is used to sight the point of impact and relay azimuth readings to control building 18 so that the location of the bomb impact may be recorded on spotting table 11.

TRACKER

Figure 3:
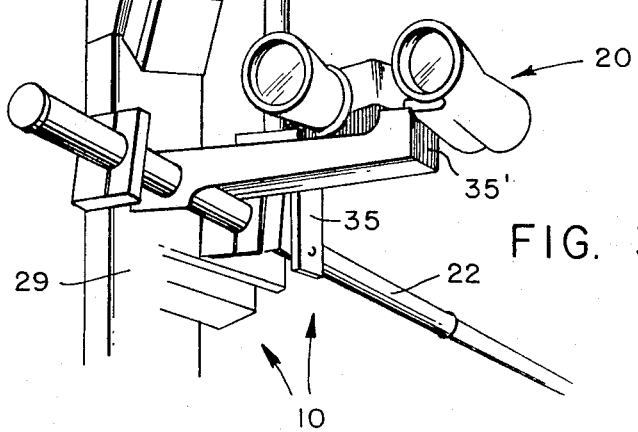
FIG. 3 is a perspective view of a portion of the tracker in greater detail.
Figure 4:
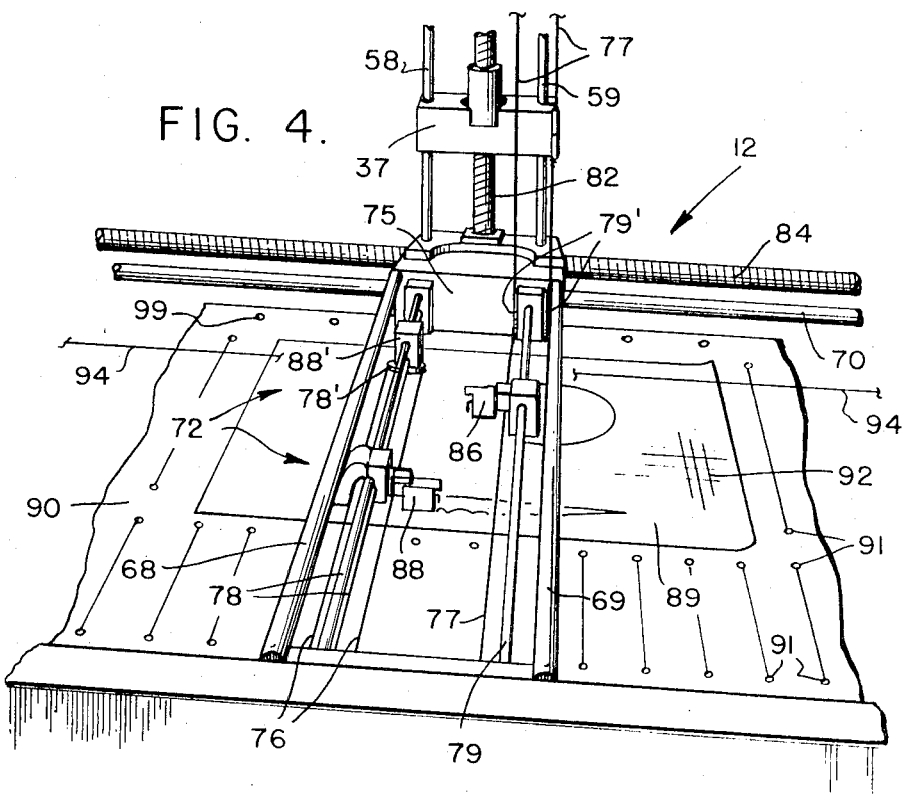
FIG. 4 is a fragmentary perspective view of a first embodiment of the plotting table.
Figure 6:
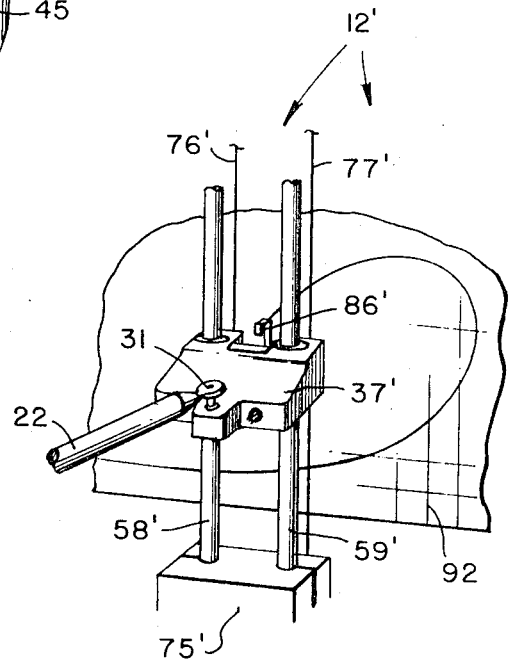
FIG. 6 is a fragmentary view of second embodiment of the plotting table.

The frame 16 of the tracker 10 (FIGS. 1-3) is a 4 by 6 inch steel box column 81 inches high. The base 19 is T-shaped, 40 by 30 inches, and is bolted to the deck after it is leveled with jackscrews (not shown). The tracker seat 24, tracker platform 26, and control head 28 for the hydraulic system (FIG. 6) that drives the plotter 12 are supported by a 3-inch column 29 welded to the tracker base 19. The seat 24 and control head assembly 28 are not power driven, but may be freely pivoted by the operator 17. Both seat 24 and platform 26 are adjustable in height for operator comfort in using the binoculars 20. An adjustable friction brake may be used to prevent the control head support 33 from turning too freely. The top of the tracker 10 is in the shape of an inverted "L" with arm 25 supporting a dovetail block 23. This block 23 contains bearing member 23' which pivotally supports a shaft 21. This shaft 21 is the vertical axis and is the pivot point in the pantograph system which allows the tracker vector tube 22 carrying the binoculars 20 to pivot in the horizontal direction. The line-of-sight from the binoculars 20 to the aircraft 30 at flight line 32 is the long arm of a pantograph and the short arm is from the pivot point to the plotter vector block 37 (FIG. 4). The plotter scale is 1,000 feet to 1 inch. In order that the aircraft 30 may fly a course sufficiently offset from the flight line to allow for wind effect on the projectile, the dovetail adjustment means 27 is calibrated in increments of 0.010 inch which is equivalent to 10 feet at the flight line. The adjustment can either shorten or lengthen the arms of the pantograph, allowing the aircraft 30 to fly in a course parallel to the flight line 32 but offset up to ±1,500 feet.

The vector tube 22 is pivotally mounted in a clamp 35 at the end of the vertical shaft 21 allowing the vector tube 22 to pivot in elevation. Movement at the pivot point in nonaxial directions is held to ±0.003 inch. The horizontal axis is 62 inches above the finished flooring. Plotter accuracy is established at installation and therefore scale and calibrating adjustments are made at the time of installation. The operational length of the vector tube arm 22 is established when the plotting and tracking units are bolted to the floor. The tracker 10 is bolted in place with the pivot point directly over the point from which the orientation markers for the specific tracker were surveyed. It is leveled, then adjusted (in relation to the plotting table) to an accuracy of ±0.015 inch which allows a maximum error of 30 feet over a flight line distance of 36,000 feet.

Since the telescoping vector arm 22 is fastened between the tracker pivot point and the vector block 37 of the plotter 12, it changes in length as the optical distance to the aircraft 30 changes. In this way, the ratio between the length of the pantograph arms is maintained and the plot is accurate for all positions of the aircraft 30 in the X-Y plane of the flight line.

The binoculars 20 are mounted on an arm 35" attached to the vector tube 22 in front of the pivot point offset approximately 9 inches. This allows the vector tube 22 to pass over the shoulder of operator 17 and positions the operator 17 so that he is able to turn and tilt his head with the binoculars. The tracker 10 is connected to the plotter 12 by the vector tube 22 at a pivot point 31 shown in the FIG. 6 modification on the vertical crosshead block 37'. Thus, as the crosshead block 37 of tracker 12 is moved, the arm 22 and binoculars 20 move to track aircraft 30, for example. Since binoculars 20 and vector tube 22 are the sole load on the system, no difficulty is encountered with angles as great as ±80°.

TRACKER CONTROL

Figure 5:
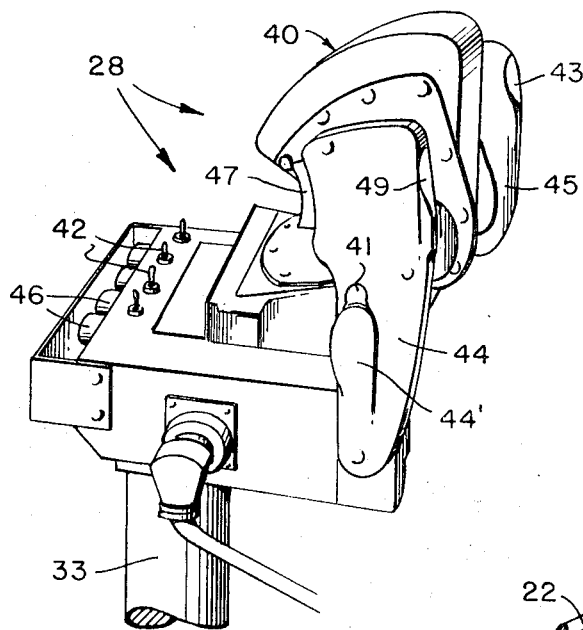
FIG. 5 is a perspective view of the control head of the tracker.

Movement of the control head 28 (See FIG. 5) drives two balanced transistor power amplifiers 54, 55 which drive the twin hydraulic pumps 64, 65 (FIG. 8) that provide hydraulic pressure for operating the plotter. The operator starts the electric motor 50, which drives the hydraulic pumps 64, 65 by pressing down one of the spring-return switches 41 with the palm of either hand. Toggle switches 42 are provided to open the circuit to prevent the operation of either the horizontal 65 or the elevation drive pump 64 if the operator wishes. When the control handles 44, 45 are in a neutral position, equal power is fed through the transistors 54, 55 and servo valves 56, 57 are, thus, held in the center position, holding the yokes 66, 67 on the variable-yoke hydraulic pumps 64, 65 in neutral so that hydraulic fluid is not pumped. Thus, even though electric motor 50 drives the hydraulic pumps, differential pressure is not generated and the hydraulic motors 74, 75 on the azimuth and elevation drives do not rotate. When operator 17 moves the position of control handles 44 in any direction from neutral, the respective amplifier signal is unbalanced, causing respective servo valve 56 and 57 to move the corresponding pump yoke offcenter, and pressure is generated by the affected pump to drive its hydraulic motor. As the yoke on the pump passes through its central or neutral position, the rotation of the hydraulic motor passes through zero and is reversed. The small potentiometers 46 shown on the control head are used to balance the outputs when the transistors are not perfectly matched.

Additional switches on the head are provided to control other functions. With his right thumb, the operator controls the limit-return switch 43 that drives the plotter out of limits, and with his left forefinger, he operates switch 47 controlling a gunsight aim point camera (not shown). The switch 49 by the operator's left thumb is a spare.

FLIGHT-PROFILE PLOTTER

Basic Design

Figure 8:
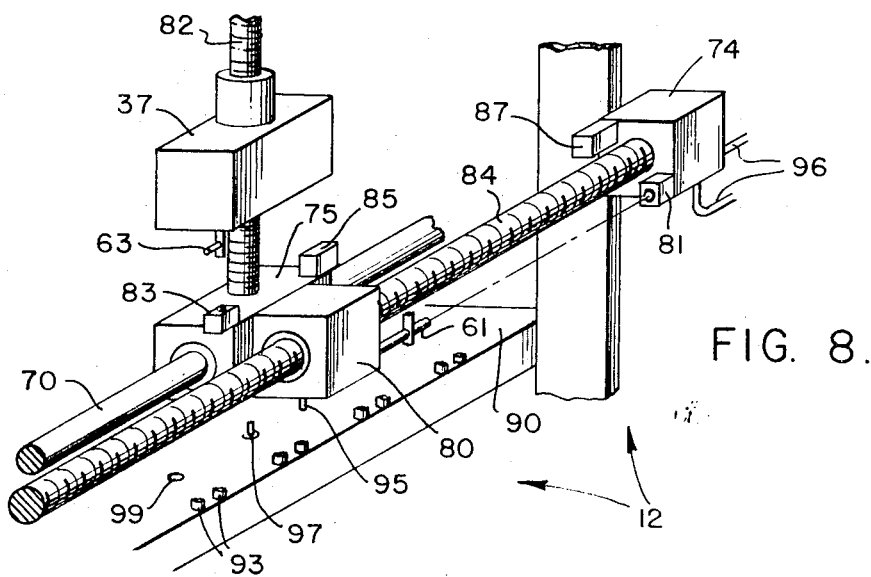
FIG. 8 is a detailed fragmentary view of the plotting table of FIG. 4.

The flight-profile plotter 12, shown in FIGS. 4 and 8 is a hydraulically driven unit designed on the principle of a pantograph with a ratio of 12,000:1 (1,000 feet at the flight line equals 1 inch on the plot). The plot is in rectangular coordinates that plot elevation, Y, versus horizontal distance, X, and range, Z, versus horizontal distance, X.

Each installation should have two plotters, one for plotting the path of the aircraft engaged in loft bombing, dive bombing, or similar maneuvers; the other to be a standby unit for training operating personnel. Either plotter can be operated by a tracking radar or by the optical tracker. The mechanical accuracy of the plotter is ±10 feet.

The plotter has two hydraulic motors 74, 75. One motor 74 drives a horizontal lead screw that moves the plotter carriage 72 in horizontal direction, and the other motor 75, mounted on the plotter carriage 72, drives a vertical lead screw 82 that moves the vector block 37 in elevation (FIG. 4). The pen 86 that plots elevation (X–Y axis) is mounted on the right side of the carriage, as seen in FIG. 4, and is connected to the vector block 37 by a steel cable 77 through a series of pulleys, not shown. Movement of the vector block 37 controls the pen 86 in elevation. A second pen 88, driven by a servo loop between the radar and the plotter, plots the position of the aircraft 30 in range (X–Z axis). It is mounted on a separate block 88′ on the left side of the carriage and is adjusted to contact the plotting sheet in the same horizontal position as does the elevation pen. Since both pens are mounted on the horizontal drive carriage, they maintain the same relative position horizontally on the plot.

Plotting Sheet Alignment

To plot the path of the aircraft accurately, a plotting sheet 89 with grid lines spaced 0.010 inch apart and each line accentuated at 1-inch intervals is used. The sheet 89 must be precisely positioned in both horizontal and vertical axes in relation to the target to be bombed. Since the width of the margin on the plotting sheet 89 may vary, alignment of the sheet on the plotting table must be made relative to the grid lines 92 thereon and not the edge of the paper. For this alignment purpose, a 0.015-inch steel cable 94 is mounted close to the plotting surface 90, parallel to the horizontal lead screw 84, and extending to the full length of the plotting surface. This cable 94 is positioned to represent either sea level, or approximate target elevation. The graph is located in elevation by positioning the graph on the plotter so that the entire length of the first horizontal gridline on the graph sheet lies under the steel cable 94. A pointer on the paper-positioning guide shows the required position of the first vertical gridline on the graph paper. A pin in the paper-positioning guide fits into any one of a series of holes drilled into a brass rail parallel to the horizontal lead screw. Each hole represents a 1,000-foot increment from the target. A number that represents this position in thousands of feet is seen through a "window" in the face of the paper guide. A 15- by 20-inch graph sheet can thus be positioned to cover any 20,000-foot portion of the 80,000-foot flight line.

A vacuum chamber, machined into the top of the table immediately under the plotting surface, is actuated by the plotter operator after the plotting sheet is properly positioned, and this secures the paper by suction through holes 91 until the plot is completed. The switch that actuates the vacuum also arms the plotting pens so that they can be operated by the penlift switches.

One training requisite is to ascertain the position of the delivering aircraft at the time of bomb impact to ensure that it is at a safe distance from the blast area. This referred to as the full-escape maneuver, and it is plotted on a 15- by 48-inch graph sheet. This graph represents a distance of 48,000 feet along the flight line.

Penlift

The paper-position guide also operates the penlift switch. This, in turn, energizes the pen solenoid as the pen plots in the direction of the line of flight. The pen plots only while in contact with the paper and is lifted clear of the plotting surface by the penlift switch 95 as the pen approaches to within one-half inch of the edge of the paper. A similar switch performs the same function in the vertical direction of the plot in either elevation or heading, thus preventing damage to the pen. The pen is operated automatically only when the 15- by 20-inch graph sheet is used. For large plots, it is operated manually by the plotter operator, who uses a pushbutton switch mounted on the horizontal crosshead.

AUXILIARY SPEED-SWITCH SYSTEM

Speed switches are used on the plotter to augment the sky screen system and check it for measuring groundspeed. In the speed-switch system, pairs of cadmium-plated screws 93 are spaced 6,000±0.002 inches apart on a bar with a total accumulated tolerance of 0.003 inch. The bar is mounted on the horizontal axis of the plotter. The cadmium-plated screws provide electrical pulses as the tracker's line-of-sight intersects discrete points of the flight line. The speed switches are oriented by sighting the tracker binocular reticle on target center and adjusting the speed-switch bar so that the switch representing target position makes contact as the dot in the binocular reticle covers the post at target center. After the time interval between the pulses from any two consecutive switches is measured on an electronic timer, the groundspeed of the aircraft can be determined by referring to a nomograph relating the time interval to distance traveled in knots. The elapsed time is automatically measured and displayed by electronic timer until reset. The accuracy of this system is ±1 inch, or within 10 ft./sec. at 600 knots; however, overall accuracy depends on the ability of the operator to keep the tracker binoculars 20 oriented on the same point of the aircraft as the switches 93 make contact at the start and finish of the speed run. Although the speed switches are not as accurate as the sky screens in measuring a speed run, they have one advantage. They operate on the same pantograph system as the tracker and are adjusted with the tracker for flight offset from the flight line.

DRIVE SYSTEM

Figure 2:
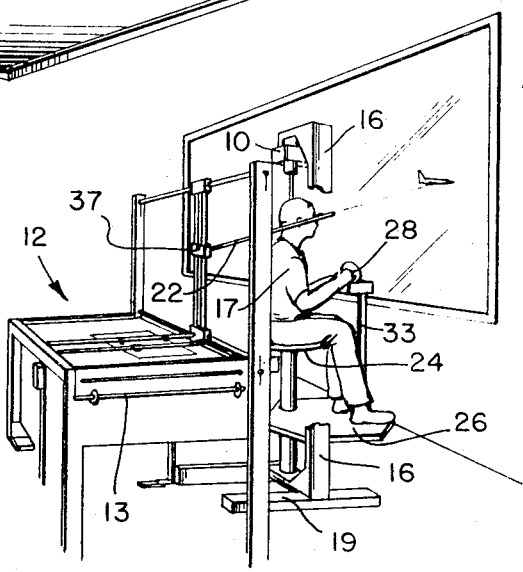
FIG. 2 is a perspective view of the novel profile tracker and plotting table in use.
Figure 7:
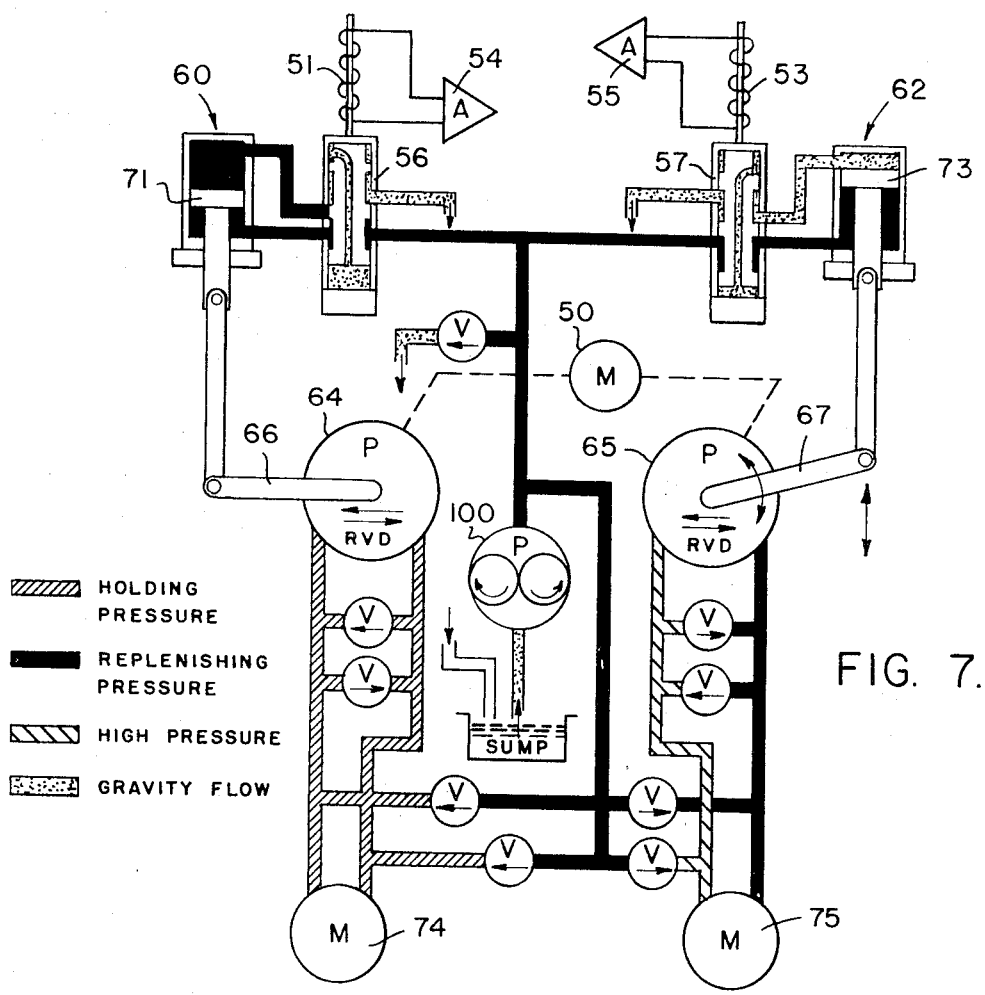
FIG. 7 is a simplified schematic illustration of the electrohydraulic control system.

A 1-horsepower electric motor 50 drives the twin variable-yoke hydraulic pumps 64, 65 (FIG. 7) through a gear train that operates in the following manner. The motor 50 drives the hydraulic pumps 64, 65 through reduction gearing (not shown). The pumps are advantageously located in the oil pump of a Vickers-type AA16865A hydraulic pump housing. Each pump has a maximum output of 0.260 cubic inch per revolution, or 1.92 gallons of hydraulic fluid per minute at 1,700 r.p.m. Outputs of the pump drive two (Vickers Model MF-3171130cBC3) hydraulic motors 74, 75 controlling elevation and horizontal positions, respectively, on the plotter (FIGS. 2 and 4). Each motor 74, 75 displaces 0.378 cubic inch per revolution and, at a speed of 1,173 r.p.m., requires 1.92 gallons of hydraulic fluid minute to drive lead screw 82, for example, through a 4:1 gear reduction at a maximum speed of 293 r.p.m. The horizontal screw 84 has a lead of 0.437 inch per revolution. The lead screw 84, turning at 293 r.p.m., moves the crosshead block 80 and pen 86, for example, on the plotter in the X-axis at a speed of 2.134 inches per second, which is equivalent to an aircraft flying along the flight line at 1,280 knots. The elevation screw 82 has a lead of 0.413 inch per revolution and, when rotating at 293 r.p.m., moves the vector block 37 and pen 86 on the plotter in the Y-axis at 2.017 inches per second, which is equivalent to an aircraft climbing at the rate of 1,210 knots. The range function of the plotter is entirely electrical and is taken from an M-33 radar aquisition unit (not shown). A servomotor (not shown) drives the range pen 88 from signals supplied by a range computer (not shown). A feedback potentiometer geared to the servomotor supplies error signals in a known manner to drive the range servo to a null. The pen blocks 86 and 88 are driven by steel cables 76, 79 around pulleys 78', 79' on the servo drive motor and vector block respectively.

TRAVEL LIMITS OF PLOTTER

Since the equipment would sustain severe damage if the crosshead 80 or vector block 37 were driven into the end of the plotter table 12, two types of limit protection are provided (FIG. 8). Microswitches 81, 83 are mounted about 2 inches from each end of travel in both horizontal and elevation positions (FIG. 8). If either the crosshead 80 or vector block 37 depresses one of these switches 81, 83, an electrical circuit opens and stops both pumps and drive motors immediately. The operator 17 then returns the controls to neutral, presses the limit-return switch 43, and turns the control to drive the block in the direction away from the limit switch. If the operator does not reverse the control when the limit-return switch 43 is depressed, the block will continue through the limit switch and again be in a position to cause damage. To overcome this possibility, a friction-type clutch (not shown) is mounted between the output of the elevation gearbox and the lead screw drive. When the block comes against a stop 85 or 87, the clutch slips so that the respective hydraulic motor is disconnected from the lead screw. The operator must depress the limit-return switch 43 again and reverse the control to drive the block out of limits. Although the friction clutch would disconnect the hydraulic drive in elevation if the limit switches 81, 83 were not in the circuit, the vector block 37 may reach the clutch with sufficient speed to damage the plotter. The limit switches 81, 83 eliminate this potential hazard and also reduce wear on the clutch.

On the horizontal drive, the clutch is replaced by a bypass valve in the hydraulic pump to limit the pressure to 300 p.s.i. A stop 87 is placed on the lead screw, just beyond the limit switch, which prevents further travel; this causes the pressure to build up from its normal of 100 to 300 p.s.i., and the bypass valve opens, preventing further buildup.

SKY SCREEN SYSTEM

The sky screen system consists of a group of six sky screen telescopes 15 mounted horizontally on a common rack near the ceiling of the control building. This permits each telescope a view of an area 20 feet wide and 200 feet high in the vertical plane of the flight line 32. A sky screen telescope is boresighted on each flight line marker 34 from 30,000 feet to target center. It is then raised to cover an elevation of 50 to 250 feet above the flight line.

The sky screen operates by a change in ambient light striking the grid of a photomultiplier tube. Sky screen sensitivity is adjusted by changing the anode voltage to the photomultiplier tube. The adjustment is made at a power supply on a timing console (not shown) and accommodates changes in atmospheric conditions, background contrast with aircraft, changes in ambient light caused by cloud coverage, and noise created by heat-wave turbulence. As the aircraft passes through the field of view of successive sky screen telescopes the change of light on the respective phototubes connected to an electronic timer. The timer records elapsed time in seconds and this information is converted to speed in knots by the use of a nomograph. True airspeed is measured by averaging two runs in opposite directions or by revising groundspeed for known wind velocity and direction. Data provided by the sky screen are accurate only if the aircraft flies directly over the flight line during the timing period.

The accuracy obtainable with the sky screen system in the measurement of aircraft groundspeed is within 2 ft./sec. for speeds to 1,000 ft./sec. or 592 knots.

The sky screen system is used in preference to the speed-switch system whenever possible because of its accuracy. However, since the sky screen is more susceptible to false readings caused by changes in ambient light, atmospheric turbulence passing birds or other forms of interference, it is advisable to use the speed switches concurrently as a backup system. The ground speed reading triggered by the sky screen can be registered on the electronic timer, which reads in seconds; the speed switches can operate the mechanical timer, which reads directly in knots. These functions area advantageously arranged so that they may be interchanged. Other problems inherent within the telescope sky screen are the difficulty of boresighting in wooded areas, and spurious triggering signals received by the vibration of the control building. This is particularly true when the control building is located in a 75- or 125-foot tower, as is the case at Norfolk and Pinecastle.

IMPACT-SPOTTING QUADRANT

To ensure accuracy, impacts are observed by spotter operators from three spotting towers 36. (See FIG. 1 for tower location.) Position indication of impact is obtained by triangulation. The spotter rakes the target area with an impact-spotting quadrant equipped with a telescope, or a pair of binoculars, having a cross hair reticle. A total rake angle of 37° covers a 2,000-foot radius around the target from a distance of 6,000 feet. A 6:1 gear ratio is used on the rake to expand the scale for more accurate reading. The smallest scale divisions are 0.112 inch apart and indicate 2 mils of angle. A vernier incorporated into the system allows a reading to one-fourth mil, representing 1½ feet at a distance of 6,000 feet. The scale reads from 1,000 to 2,100 milliradians and is adjusted so that target reads 1,600 mils. Plus or minus readings as a source or error are thus avoided, since every reading is positive.

IMPACT-SPOTTING BOARD

Each spotting tower maintains communication with the control building by telephone, intercom, or radio. Each spotter operator calls his quadrant readings to the impact recorder in the control building who records the data of his spotting sheet and plots the impact point on the impact-spotting board 11. The board 11 is laid out the same as the actual target area on a scale of 200 feet to the inch.

The original impact-spotting board designed for this system, which is still in use at some ranges, has lucite arms for plotting impacts. The arm is pivoted from a point representing the position of the spotting tower in relation to the target, and extends beyond the target position to a scale graduated in 2-mil divisions. Three arms are used to represent the three spotting towers. When the arm passes through target center on the plotting sheet, it also passes through the 1,600-mil graduation on the position-indication scale. In this way, the reading from the impact spotter represents the same position in relation to the target as shown by the arm on the spotting board. On later model boards, the arms have been replaced with nylon fish lines, one end weighted and the other end held in place by magnets. The point at which the three lines intersect is much easier to mark, since the lines are only about 0.015 in diameter. The magnets are less cumbersome and much easier to handle.

A pilot's first flight is made over the flight line to calibrate the aircraft's airspeed indicator in a series of straight and level runs made alternately in opposite directions to cancel wind effects. He then begins training in the over-the-shoulder delivery maneuver, a flight pattern including all the release angles that must be known for loft bombing. This is followed by training 20°, 40°, and 50° loft-bombing maneuvers, and the escape maneuver for each type of delivery.

CHARACTERISTICS OF THE MANEUVER

During the maneuver, a tone or audio signal, initiated when the pilot begins his pullup and terminated at bomb release, is transmitted via the aircraft's radio to a receiver in the control building. The audio signal energizes a relay that operates the electronic timer, causing the plotter pen to lift one for a ¼-second period when the tone starts, and again when the tone stops. An accurate profile of each pass is made on the plotter. This is compared to an optimum profile drawn on the profile sheet by means of a template which is positioned by the "tone on" gap in the profile. Possible errors made by the pilot, together with pointers on corrections required are communicated to him immediately by the range control officer or the squadron representative. This information includes checking on six points: (1) actual pullup point as indicated by the tone, relative to correct pullup point, (2) the position of the actual profile, relative to the true profile at 45°, (3) the 90° point, (4) at top of profile, (5) at the release point, and (6) at the impact point. All this is recorded on the profile sheet 92 along with the date, time, squadron, type of ordnance, type of delivery, sky cover, wind, temperature, pilot, aircraft, pass and round number, groundspeed, time from speed run to pullup, time from pullup to release, and time from release to impact. The name of the tracker operator should be entered on each profile sheet for reference and all data should be double-checked. The data sheets are given the squadron representative at the end of the day's operations and are made available to each pilot for study.

CONCLUSIONS

On an instrumented range of the type described, the average squadron pilot is able to perform successfully the low altitude special-weapon-delivery maneuvers after approximately ten operational flights. If two flights per day of eight passes each are flown, the average pilot can qualify in a 5-day period. Pilots who train on an instrumented range learn to perform these maneuvers with such accuracy that they can fly them successfully on any target. On the other hand, pilots who train on an uninstrumented range learn by a hit-and-miss process of adjusting any one of the variables in a given maneuver in order to hit a particular target. If the variable adjusted is not the correct one, the pilots are unable to score hits on other targets.

Squadron leaders who were questioned on the length of time required to train a pilot on an uninstrumented range as compared with an instrumented one gave varied estimates. Some estimated that instrumented ranges reduce training time by as much as a factor of four; others stated that a pilot can never be satisfactorily trained on an uninstrumented range. The tremendous savings in man-hours and aircraft operating expense soon justify the small investment in training range facilities.

What is claimed is:

1. Means for graphically recording a two-dimensional representation of the path of an object along a marked run comprising:
   optical tracker means;
   plotting means including;
     record sheet holding means,
     recording means,
     carrier means mounting said recording means for reciprocal movement in a first path,
     means mounting said carrier means for reciprocal linear movement in a second path orthogonal to said first path,
     vector block means mounted on said carrier means for movement in a reciprocal linear movement in a third path orthogonal to said first and said second paths,
     means connecting said vector block to said recording means to move said recording means along said first path as said vector block moves along said third path;
   drive means for moving said carrier means and said vector block means so that said recording means traces a path on a record sheet held by said sheet-holding means;
   said optical tracker means including manually operable means for controlling said drive means;
   optical augmentation means pivotally suspended in spaced relation to said manually operable means and operably connected to said vector block means in such a manner that;
   when said manually operable means is moved in azimuthal or elevational directions, said vector block is moved in said third direction and along with said carrier means in said second direction respectively, depending on the degree of manipulation of said manually movable means;
   movement of said vector block means, through said operable connection with said optical augmentation means, moving said augmentation means in azimuth and elevation respectively to track an object; and
   movement of said vector block means coincidentally with movement of said carrier means causing movement of said recording means over said sheet to produce a graphic plot of the path traversed by the object being tracked.

2. The apparatus of claim 1 further including:
   a plurality of switch devices equally spaced along the path of said carrier;
   switch-actuating means positioned on said carrier means to serially actuate said devices as said carrier means is moved;
   timer display means for indicating lapsed time between actuation of successive ones of said devices.

3. In a system for graphically recording a two-dimensional representation of the path of an object along a marked run and including optical tracking means and record plotting means, plotting board means comprising;
   a table;
   a carrier mounted for reciprocal movement in a plane offset from and parallel to the top surface of said table;
   a marking device mounted on said carrier for reciprocal movement orthogonal to the movement of said carrier;
   vector block means mounted on said carrier for reciprocal movement orthogonal to the movement of said carrier and to the movement of said marking device;
   connecting means between said vector block means and said marking device to transfer motion between said block and said device.

4. Plotting board means according to claim 3 further comprising:
   fluid motor means for selectively and variably supplying motive power to move said carrier and said vector block respectively;
   electrically operable valve means responsive to variations in electrical current for controlling fluid flow to said motor means; and
   manual means for variably supplying electrical current to said valve means.

* * * * *